United States Patent [19]
Hendrickson

[11] 3,983,787
[45] Oct. 5, 1976

[54] RELAY VALVE FOR A TOW VEHICLE-TRAILER BRAKING SYSTEM

[75] Inventor: Richard T. Hendrickson, South Bend, Ind.

[73] Assignee: The Bendix Corporation, South Bend, Ind.

[22] Filed: May 1, 1975

[21] Appl. No.: 573,650

[52] U.S. Cl. .................................. 91/32; 60/546; 91/412; 303/7; 303/40; 137/627.5
[51] Int. Cl.$^2$ ........................................ F15B 13/04
[58] Field of Search ............. 303/7, 40; 91/32, 412; 137/627.5; 60/546, 411, 397

[56] References Cited
UNITED STATES PATENTS

| | | | |
|---|---|---|---|
| 3,117,822 | 1/1964 | Blair | 303/7 |
| 3,667,815 | 6/1972 | Zoppi | 303/7 |
| 3,771,838 | 11/1973 | Rossigno | 303/7 |
| 3,790,807 | 2/1974 | Rossigno | 303/7 |
| 3,856,362 | 12/1974 | Howard | 303/7 |
| 3,856,363 | 12/1974 | Kasselmann | 303/7 |
| 3,893,692 | 7/1975 | Presley | 303/7 |

FOREIGN PATENTS OR APPLICATIONS 1,150,823  5/1969  United Kingdom..................... 303/7

OTHER PUBLICATIONS

B400,310, Kasselmann et al., "Pressure Differential Trailer Braking System", 1/28/75.

Primary Examiner—Martin P. Schwadron
Assistant Examiner—Abraham Hershkovitz
Attorney, Agent, or Firm—Leo H. McCormick, Jr.; William N. Antonis

[57] ABSTRACT

A relay valve for transmitting an operational signal to a first brake applying servomotor in a trailer upon actuation of a second brake applying servomotor in a tow vehicle. The relay valve has a housing with a movable wall which sequentially interrupts the communication of vacuum to a power chamber in the first brake applying servomotor and thereafter allows air to be communicated to the power chamber. With air in the power chamber, an operational pressure differential will be developed which will operate the first brake applying servomotor.

8 Claims, 1 Drawing Figure

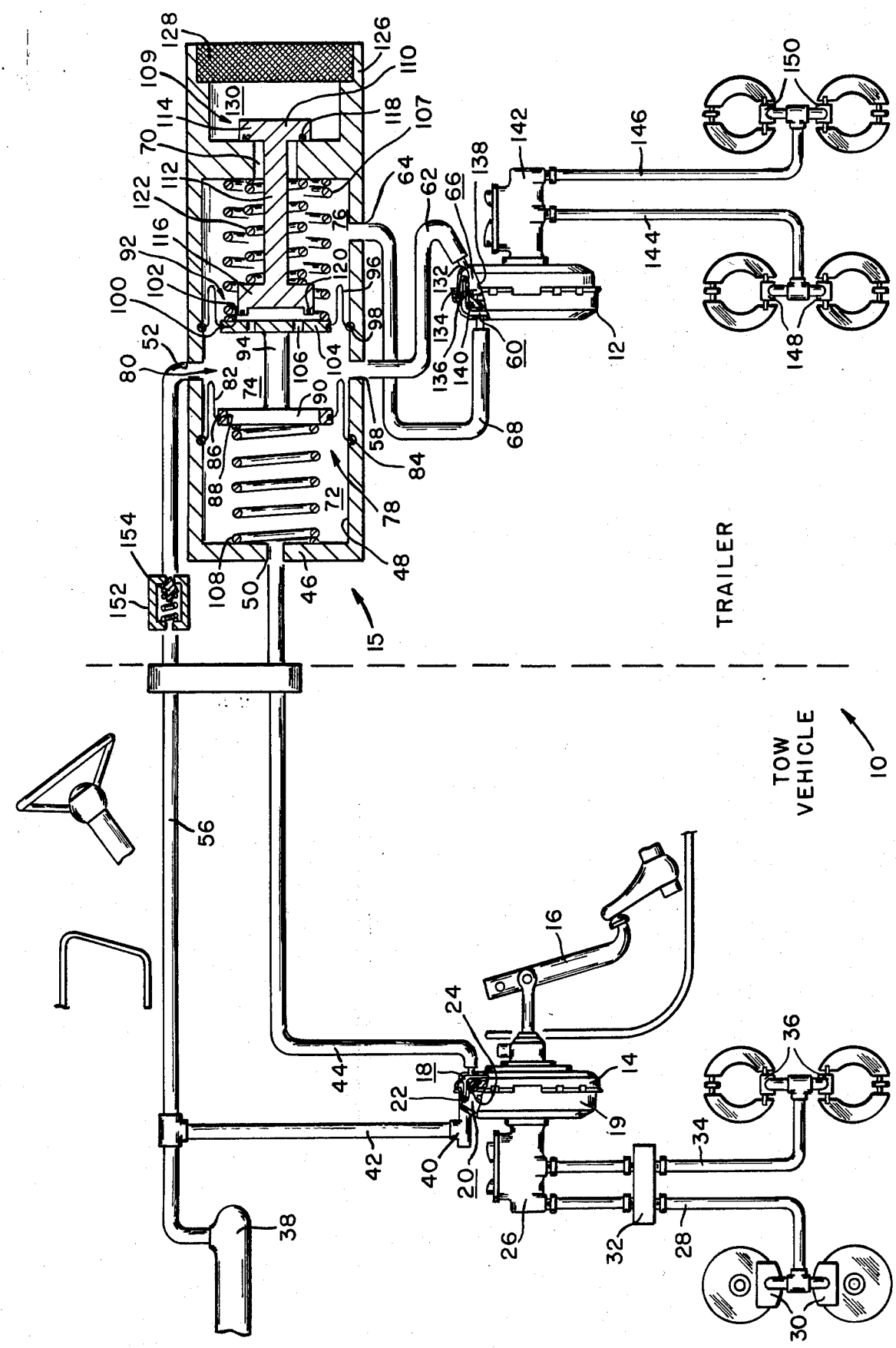

RELAY VALVE FOR A TOW VEHICLE-TRAILER BRAKING SYSTEM

BACKGROUND OF THE INVENTION

With the increasing popularity of recreational vehicles which are moved by a tow vehicle over roads of various surfaces, it is necessary to provide adequate braking for such tow vehicle-trailer combinations.

In U.S. Pat. 3,915,507, a braking system is disclosed wherein the input force applied to the brake pedal in the tow vehicle is transmitted to a hydraulic pressure sensor. The hydraulic pressure sensor in turn will generate an operational signal for operating a servomotor in the trailer with a corresponding input force. However, in some installations due to the position and length of line through which the input force must travel to operate the hydraulic sensor, it is possible to develop a false actuation signal. The creation of the false actuation signal is enhanced when the hydraulic sensor is subjected to very cold ambient temperatures.

SUMMARY OF THE INVENTION

I have devised a tow vehicle-trailer braking system wherein the air pressure, which is utilized to create a pneumatic pressure differential in a first servomotor in the tow vehicle, is simultaneously transmitted to a relay valve which actuates a corresponding second servomotor in the trailer. The relay valve has a wall means which will respond to the air pressure to sequentially interrupt the communication of vacuum to a power chamber in the second servomotor and allow air to proportionally enter into the power chamber as a function of the air pressure present in the first servomotor in the tow vehicle.

It is, therefore, the object of this invention to provide a tow vehicle-trailer system with a relay valve means for simultaneously actuating the servomotor in the trailer with a servomotor in the tow vehicle.

It is another object of this invention to provide a tow vehicle-trailer with a pneumatic operated relay valve for transferring an operational signal to a servomotor in a trailer in response to air being presented to a pressure differentially operated servomotor in the tow vehicle.

It is a still further object of this invention to provide a relay valve means with a wall means for separating a housing into a control chamber, a flow through chamber, and an actuation chamber for allowing a source of vacuum to evacuate air from a power chamber and a vacuum chamber in a servomotor in a trailer during a first mode of operation and for allowing air to enter the power chamber and develop a pressure differential in the servomotor during a second mode of operation in response to an operational signal supplied to a brake actuator in the tow vehicle by the operator.

These and other objects of this invention will become apparent from reading the specification and viewing the drawings.

BRIEF DESCRIPTION OF THE DRAWINGS

The drawing is a schematic illustration of a tow vehicle-trailer braking system with a sectional view of a relay valve for transmitting an operational signal from a tow vehicle to a trailer in order that the wheel brakes on the tow vehicle trailer combination will be simultaneously actuated.

DETAILED DESCRIPTION OF THE PREFERRED EMBODIMENT

The tow vehicle-trailer braking system 10 shown in the drawing, has a first servomotor 12 located in the trailer and a second servomotor 14 located in the tow vehicle. The second servomotor 14 is of a type completely described in U.S. Pat. No. 3,106,873. The second servomotor 14 is connected to the first servomotor 12 through a relay valve means 15. The relay valve means 15 is adapted to synchronize the actuation of the operation of the first servomotor 12 with that of the second servomotor 14.

The second servomotor 14 has a housing 19 which is divided into a front chamber 20 and a rear chamber 18 by a diaphragm 22. The diaphragm 22 is attached to a backing plate 24 through which an output push rod supplies a master cylinder 26 with a force which pressurizes the hydraulic fluid located therein. The master cylinder 26 has a first line 28 connected to the front wheel brakes 30 and a second line 34 connected to the rear wheel brakes 36 through a pressure differential warning switch 32.

The front chamber 20 is connected to the intake manifold 30 of the tow vehicle through conduit 42. A check valve 40 is located in conduit 42 to maintain the vacuum level in the servomotor 14 at a substantially uniform level once the air therein has been evacuated.

The rear chamber 18 of the second servomotor 14 is connected to the relay valve means 15 through a conduit 44. The relay valve means 15 has a housing 46 with an axial bore 48 located therein. The housing has a first port 50 which connects the axial bore 48 with conduit 44, a second port 52 through which the axial bore 48 is connected by conduit 56 to the intake manifold 38, a third port 58 through which the axial bore 48 is connected to the vacuum chamber 66 in the first servomotor 14 by conduit 62, a fourth port 64 through which the axial bore 48 is connected to the power chamber 60 in the first servomotor 14 by conduit 68, and a fifth port 70 through which the axial bore 48 is connected to the atmosphere. The axial bore 48 of the relay valve means 15 is divided into a control chamber 72, a flow through chamber 74, and an operational chamber 76 by a wall means 78 which is moved by an actuation signal transmitted from the second servomotor 14 to the relay valve means 15.

The wall means 78 has a first piston 80 and a second piston 92 separated by a spacer 94. The first piston 80 includes a diaphragm 82 having an external bead 84 secured to the housing 46 and an internal bead 86 secured to a groove 88 in disc or plate 90. Thus, the control chamber 72 is completely sealed from the remainder of the axial bore 48 to prevent the actuation signal which is communicated through the first port 50 from being modified by being reduced by the vacuum presented to the second port 52 from the intake manifold 38.

The second piston 92 includes a diaphragm 96 which has an external bead 98 secured to the housing 46 and an internal bead 100 located in a groove 102 in plate or disc 104. Plate or disc 104 has a series of axial openings 106 through which the flow through chamber 74 is connected to the operational chamber 76. A first spring 107 which is located in the operational chamber and a second spring 108 which is located in the control chamber will center the wall means 78 to allow unrestricted communication of vacuum between the second port 52 and the third port 58 and flow from chamber 74 to the operational chamber 76 through the axial openings or passages 106.

A poppet means 109 has a plunger 110 with a stem 112 which separates a first face member 114 from a second face member 116. The first face member 114 has a resilient ring 118 located adjacent the opening of the fifth port 70 while the second face member 116 has an annular resilient surface 120 adjacent to the second plate or disc 104. A spring 122 which is located between the housing and the second face member 116 holds the resilient ring 118 of the first face member 114 against the housing surrounding the fifth port 70 to seal the operational chamber 76 from the atmosphere. The housing 46 has an annular projection 126 which surrounds the fifth port 70 to prevent the first face member 114 from being exposed to external contaminants. A filter 128 is secured to the annular projection 126 to prevent any air borne contaminants from entering into the atmospheric chamber 130.

The vacuum chamber 66 in the first servomotor is separated from the power chamber 60 by a diaphragm 132 which is held in a groove 136 by a twist lock connection 134. A return spring 138 acts on a diaphragm plate 140 to hold a piston in the master cylinder 142 in a released position.

The master cylinder 142 has a first line 144 connected to a first portion 148 and a second line 146 connected to a second portion 150 of the brakes on the trailer.

MODE OF OPERATION OF THE PREFERRED EMBODIMENT

The internal combustion engine in the tow vehicle will produce a vacuum at the intake manifold 38 upon being started. Vacuum at the intake manifold will evacuate air from the first servomotor 12 by flowing along a flow path from the relay valve means 15 provided by the supply conduit 56. A check valve 152 located in the supply conduit has a resiliently biased valve 154 which will only allow flow from the relay valve means 15 toward the intake manifold 38. Any air present in the vacuum chamber 66 of the first servomotor 12 will be directly evacuated therefrom by flowing in conduit 62 past the third port through the flow through chamber 74 and out the second port 52 into the supply conduit 56.

Simultaneously with the evacuation of air from the vacuum chamber 66, air will also be evacuated from the power chamber 60 by flowing in conduit 68 to the fourth port 64 into the operational chamber 76 and into the flow through chamber 74 by way of the axial openings or passageway 106. With the evacuation of air from both the power chamber 60 and the vacuum chamber 66, spring 138 in the servomotor 12 can easily urge the diaphragm 132 and attached piston in the master cylinder 14 toward a rest position.

At the same time, vacuum is communicated through conduit 42 to evacuate air from the front chamber 20 and rear chamber 18 in the second servomotor 14 through a well known internal valve arrangement fully disclosed in U.S. Pat. No. 3,106,873.

When an operator wishes to apply the brakes in this tow vehicle-trailer combination 10, an input force is applied to the foot pedal 16 which operates the internal valve arrangement in the second servomotor 14. When this internal valve is operated, air enters the rear chamber 18 to create a pressure differential across the diaphragm 22. The pressure differential moves the piston in the master cylinder 26 to provide the wheel brakes 30 and 36 in the tow vehicle with an operational input. As the air enters the rear chamber 18, an actuation signal resulting therefrom is communicated to the control chamber 72 of the relay valve means 15 through conduit 44. The actuation signal, air under pressure, in the control chamber 72 produces an actuation pressure differential across the first piston 80 with the vacuum in the flow through chamber 74. This actuation pressure differential causes the wall means 78 to move into contact with the annular ring 120 on the second face member 116 to interrupt the communication of vacuum between the flow through chamber 74 and the operational chamber 76 by overcoming spring 107. As the actuation pressure differential increases, spring 122 will also be overcome to allow air to enter into the operational chamber 76 by flowing through the fifth port 70. This air will now be communicated through conduit 68 for presentation to the power chamber 60 in the first servomotor. With air in the power chamber 60 and vacuum in the vacuum chamber 66, a trailer brake applying pressure differential will be created which will move the diaphragm 132 in opposition to return spring 138. As the diaphragm 132 is moved, a hydraulic output force is created in the master cylinder 142. This hydraulic output force is communicated through lines 144 and 146 to the wheel brakes on the trailer.

Thus, the relay valve means 15 continues to transmit an operational input force to the power chamber 60 until the air in the operational chamber 76 and the air in the control chamber 72 are substantially equal. Thereafter, the spring 122 will move plunger 110 against the housing 46 to prevent any more air from the atmosphere from entering into the operational chamber 76.

Upon termination of the input force to foot pedal 16, vacuum again evacuates the air present in the rear chamber 18 of the second servomotor. With vacuum in the rear chamber 18, the air present in the control chamber 72 of the relay valve means 15 is also evacuated. Since the operational chamber 76 now contains air, a release pressure differential is created across wall means 76 which moves the second piston 92 away from the second face member 116. This will permit the vacuum present in the flow through chamber 74 to evacuate the air from the power chamber and allow the return spring 138 to move the diaphragm into a release position.

Thus, I have provided a tow vehicle-trailer combination with a relay valve means which will actuate a servomotor in a trailer at substantially the same time as the brakes in the tow vehicle.

I claim:

1. In combination, a first servomotor having a power chamber and a vacuum chamber, a second servomotor having a front chamber and a rear chamber, and a relay valve means for actuating said first servomotor in response to an actuation signal supplied to said second servomotor, said relay valve means comprising:

a housing having a bore therein with a first port connected to the rear chamber of said second servomotor, a second port connected to a source of vacuum, a third port connected to the vacuum chamber in said first servomotor, a fourth port connected to the power chamber in said first servomotor, and a fifth port connected to the atmosphere;

wall means located in said bore for establishing a control chamber adjacent the first port, a flow through chamber between the second and third ports, and an operational chamber between the fourth port and the fifth port, said wall means having a passageway therethrough to provide communication between the flow through chamber and the operational chamber;

first poppet means located adjacent said fifth port for regulating the flow of air from the atmosphere into the operational chamber;

second poppet means for cooperating with said wall means to prevent communication between the flow through chamber and the operational chamber through said passageway;

first resilient means connected to said first poppet means for urging the face of the first poppet means against the housing surrounding the fifth port to prevent air from the atmosphere from entering into the operational chamber; and second resilient means connected to said wall means for urging said wall means away from said second poppet means to allow vacuum present in said flow through chamber to evacuate air from the power chamber of the first servomotor by flowing through the fourth port into the operational chamber and through the passageway to the flow through chamber, said wall means responding to an actuation pressure in the rear chamber of the second servomotor when said actuation signal is supplied to said second servomotor by moving into engagement with said second poppet means in opposition to said second resilient means to seal said passageway and prevent communication of vacuum between the flow through chamber and the operational chamber, said wall means responding to a further increase in pressure in the rear chamber of said second servomotor by moving said first poppet means away from the fifth port in opposition to said first resilient means to allow air to flow into the operational chamber and out the fourth port to the power chamber in the first servomotor and there develop a pressure differential with the vacuum present in the vacuum chamber, said pressure differential actuating the first servomotor.

2. The combination as recited in claim 1, wherein said wall means includes:

a first diaphragm having a first external bead and a first internal bead, said first external bead being secured to said housing; and a first plate having a first groove therein into which said first internal bead is located to separate the control chamber from the flow through chamber.

3. The combination as recited in claim 2, wherein said wall means further includes:

a second diaphragm having a second external bead and a second internal bead, said second external bead being secured to said housing;

a second plate having a second groove therein into which said second internal bead is located, said second plate having a series of axial openings therethrough to form said passageway whereby said flow through chamber is communicated to said operational chamber; and spacer means connected to said first plate and second plate to provide simultaneous movement of the second plate upon said actuation pressure moving said first plate.

4. The combination as recited in claim 3, wherein said first poppet means includes a plunger having a first face member exposed to atmospheric pressure on a first end and the second poppet means includes a second face member on a second end of the plunger, located in the operational chamber, said first face member being separated from said second face member by a stem which extends through the fifth port in the housing, said first resilient means being located between the housing and the second face member for urging said first face member to a position closing said fifth port in said housing.

5. The combination as recited in claim 4, wherein said second resilient means includes:

a first spring located in the operational chamber between the housing and the second plate for holding said second plate away from the second face member and thereby disengaging the second poppet means to allow free communication between the flow through chamber and the operational chamber.

6. The combination as recited in claim 5, wherein said second resilient means further includes:

a second spring located in the control chamber between the housing and the first plate for centering the first plate and the second plate on opposite sides of the second port and the third port to allow the vacuum present in the flow through chamber to freely evacuate air from the vacuum chamber in the first servomotor.

7. The combination as recited in claim 6, wherein said housing further includes:

an annular projection surrounding said fifth port to protect said first face on the plunger from being exposed to the atmosphere.

8. The combination as recited in claim 7, wherein said housing further includes:

filter means surrounding said annular projection for preventing any air borne contaminants from entering into the operational chamber through the fifth port.

* * * * *